US007020715B2

(12) United States Patent
Venkataraman et al.

(10) Patent No.: US 7,020,715 B2
(45) Date of Patent: Mar. 28, 2006

(54) PROTOCOL STACK FOR LINKING STORAGE AREA NETWORKS OVER AN EXISTING LAN, MAN, OR WAN

(75) Inventors: Srinivasan Venkataraman, Fremont, CA (US); Ramkumar Jayam, San Jose, CA (US); Anil Kapatkar, San Jose, CA (US); Sivakumar Munnangi, Santa Clara, CA (US)

(73) Assignee: Adaptec, Inc., Milpitas, CA (US)

( * ) Notice: Subject to any disclaimer, the term of this patent is extended or adjusted under 35 U.S.C. 154(b) by 745 days.

(21) Appl. No.: 09/934,977

(22) Filed: Aug. 21, 2001

(65) Prior Publication Data
US 2002/0046289 A1  Apr. 18, 2002

Related U.S. Application Data

(60) Provisional application No. 60/227,146, filed on Aug. 22, 2000.

(51) Int. Cl.
*G06F 15/16* (2006.01)

(52) U.S. Cl. ............... 709/236; 709/230; 709/232; 709/203; 370/351; 370/389; 370/466; 370/470; 370/472; 370/474; 370/476

(58) Field of Classification Search .......... 709/236, 709/230, 232, 203; 370/470, 472, 474, 476, 370/466, 351, 389
See application file for complete search history.

(56) References Cited

U.S. PATENT DOCUMENTS

| | | | |
|---|---|---|---|
| 5,954,796 A | 9/1999 | McCarty et al. | 709/222 |
| 6,014,383 A | 1/2000 | McCarty | 370/453 |
| 6,065,087 A * | 5/2000 | Keaveny et al. | 710/315 |
| 6,076,115 A | 6/2000 | Sambamurthy et al. | 709/250 |
| 6,098,125 A | 8/2000 | Fiacco et al. | |
| 6,212,190 B1 * | 4/2001 | Mulligan | 370/400 |
| 6,341,129 B1 * | 1/2002 | Schroeder et al. | 370/354 |
| 6,400,730 B1 * | 6/2002 | Latif et al. | 370/466 |
| 6,430,201 B1 * | 8/2002 | Azizoglu et al. | 370/535 |
| 6,690,682 B1 * | 2/2004 | Giaretta et al. | 370/535 |
| 6,721,798 B1 * | 4/2004 | Kubista | 709/236 |
| 6,738,821 B1 * | 5/2004 | Wilson et al. | 709/230 |
| 2002/0114328 A1 * | 8/2002 | Miyamoto et al. | 370/389 |
| 2003/0177243 A1 * | 9/2003 | Collette et al. | 709/227 |
| 2005/0111451 A1 * | 5/2005 | Kim | 370/389 |

OTHER PUBLICATIONS

Fibre Channel Industry Association, "Fibre Channel Switch Vendors Agree on Common Interoperability Standard," at <http://www.fibrechannel.org/press/fcia000622.html>, pp. 1-2, Jun. 22, 2000.

Genroco, Inc., "Leading High Performance Networking Vendors Demonstrate World's Fastest System and Storage Area Network" at <http://www.fibrechannel.org/press/genroco991014.html>, pp. 1-2, Oct. 14, 1999.

* cited by examiner

*Primary Examiner*—Saleh Najjar
*Assistant Examiner*—Shawki S. Ismail
(74) *Attorney, Agent, or Firm*—IP Strategy Group, PC

(57) ABSTRACT

The present invention provides for a method and protocol for high bandwidth, low-latency and reliable transfer of variable length FC Frames over the Gigabit Ethernet.

15 Claims, 5 Drawing Sheets

FC Frame segmented into two Ethernet Frames

Ethernet Frame
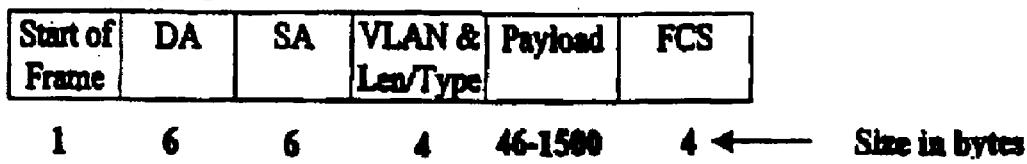
Fig. 1A (Prior Art)
FC Frame
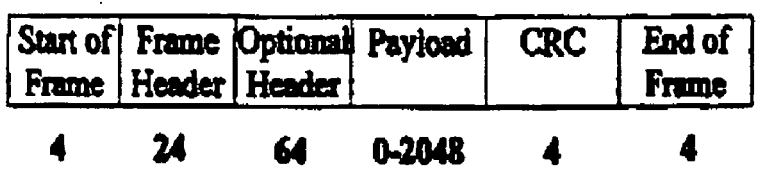
Figure 1.B (Prior Art)

PROTOCOL STACK FOR LINKING STORAGE AREA NETWORKS OVER AN EXISTING LAN, MAN, OR WAN

This application claims the benefit of U.S. Provisional Application No. 60/227,146 filed Aug. 22, 2000.

FIELD OF THE INVENTION

The present invention is directed to protocol stacks used to transfer data between a plurality of host computing devices connected to one or more networks and more specifically to a method and protocol stack for transferring Fibre Channel frames over a Gigabit Ethernet.

BACKGROUND OF THE INVENTION

A Storage Area Network (SAN) is a sub-network of shared storage devices such as disk and tape. SANs provide high-speed, fault-tolerant access to data for client, server and host computing devices ("host computers"). Traditionally, computers were directly connected to storage devices, such that only the computer that was physically connected to those storage devices could retrieve data stored therein. A SAN allows any computer connected to the SAN to access any storage device included within the SAN. As more storage devices are added to a SAN, they become accessible to any computer connected to the SAN. The explosion of the Internet, the consolidation of servers and the growing complexity of applications, with more graphics, video and sound data to be stored, are resulting in a burgeoning demand for improved storage interconnect solutions for enterprise wide systems and for networks of such systems.

Typically one or more SANs can be liked to one or more Local Area Networks (LANs), Metropolitan Area Networks (MANs), or Wide Area Networks (WANs) to provide for the data storage needs of these networks. However some problems arise when a host computing device connected to a LAN, MAN or WAN wants to retrieve information from a SAN because protocol used to transfer data from SANs differs from protocol used to transfer data across the above-referenced network types.

Specifically, a Fibre Channel Protocol (FCP) standard is widely used in SANs to provide a reliable, guaranteed, low latency data transfer mechanism. FCP does not provide for "stack-like functions" but is an effective serial replacement for a parallel small computer systems interface ("SCSI"), which is the interface between a storage device that is physically connected to a computer. According to this protocol, data is organized into Fibre Channel (FC) Frames of up to 2148 bytes in length. FIG. 1B illustrates the typical structure of a FC Frame. It includes a four byte Start of Frame field, a twenty-four byte Frame Header field, an Optional Header field of sixty-four bytes, a Payload field of from zero to 2048 bytes, a four byte Cyclic Redundancy Check field ("CRC"), and a four byte End of Frame field.

By contrast, LANs, MANs, and WANs typically use a Transmission Control Protocol/Internet Protocol ("TCP/IP") standard to transfer data from one computer to another. TCP/IP is a layered group ("stack") of protocols used to efficiently transfer data across such networks by addressing problems such as data loss and out of order delivery of data blocks. TCP/IP has five layers each having a different function during data transfer. From the lowest hierarchy level to the highest hierarchy level, the five layers include a Physical Layer, a Media Access Control ("MAC") Layer, a Network Layer, a Transport Layer and a Session Layer. The functions of these five layers are based upon the functions performed by a seven-layered international protocol standard called Open Systems Interconnection (OSI) Model.

The Physical Layer is concerned with transmitting raw data bits over a communication channel. This layer makes sure that when a transmitting side sends a '1' it is received by a recipient correctly. The MAC Layer corresponds to a Data Link Layer of the OSI Model. The main task of this layer is to transmit frames sequentially. The Network Layer implements Internet Protocol ("IP") for controlling the operation of the network. A packet is the basic unit of data defined at this layer. The Network Layer determines how packets are routed from a source to a desired destination. Routes are based on static or dynamic tables available to persons of ordinary skill in the art. The Transport Layer splits the data from the Session Layer into smaller units called segments, if need be, and pass these segments to the Network Layer. It also ensures that the segments arrive correctly at the other end. Transmission Control Protocol ("TCP") is implemented by the Transport Layer. TCP generates a sequence number for each data packet. To reassemble data into the original frames, the sequence numbers must be matched up. Finally, the Session Layer defines guidelines for application user interface and communications between host computers.

Gigabit Ethernet is widely used as the physical medium in LAN, WAN and MAN environments. FIG. 1A illustrates the typical structure of an Ethernet Frame as defined by IEEE 802.3. The maximum packet size in the Ethernet domain is 1500 bytes. The Ethernet Frame includes a MAC Layer for enabling the Ethernet Frame to be transmitted sequentially. The MAC Layer includes a Start of Frame byte, a six byte destination address ("DA") field, a six byte source address ("SA") field, and a four byte virtual LAN ("VLAN") field. The remainder of the Ethernet Frame is a Payload field, and a four byte Frame Checksum ("FCS") field, which is an error checking code for the Frame.

When transferring FC frames over the Gigabit Ethernet, a given FC Frame may require being transferred as two Ethernet Frames because the maximum packet size of an FC Frame (2148 bytes) is larger than the maximum packet size of an Ethernet Frame (1500 bytes). The problem with prior art data transfers of FC Frames over the Ethernet is the inability of the TCP/IP stack to accurately transfer FC Frames of varying sizes over the Ethernet Frames, especially those FC Frames that are larger that the maximum size of a Gigabit Ethernet Frame, because prior art TCP/IP stacks are not equipped to adequately and reliably handle additional functions associated with such a transfer.

What is needed is a method and an improved TCP/IP protocol stack for: mapping any sized FC frame onto one or two Gigabit Ethernet Frames; reliably transferring the corresponding Ethernet Frame(s) over the Ethernet; and reconstructing the original FC frame at its destination, if necessary.

SUMMARY OF THE INVENTION

The present invention is directed at addressing the above-mentioned shortcomings, disadvantages, and problems of the prior art.

Broadly stated, the present invention comprises a method for generating one or more Ethernet frames having a maximum length and a maximum payload from a Fibre Channel ("FC") frame having a frame length and for transmitting said FC frame over a Gigabit Ethernet to an intended destination, said method comprising the steps of: (a) determining whether said FC frame length is smaller than said Ethernet frame maximum payload and if so generating an Ethernet frame wherein its payload comprises said FC frame and transmitting said FC frame to said intended destination, and if not then performing steps (b) through (f); (b) dividing said FC Frame into a first and second FC fragment, wherein each said FC fragment is smaller than said Ethernet frame maximum payload; (c) generating a storage transport layer field comprising said frame length; (d) generating a first Ethernet Frame comprising said storage transport layer field and said first FC fragment; (e) generating a second Ethernet Frame comprising said second FC fragment; and (f) transmitting said first and second Ethernet Frames including said FC fragments over the Ethernet to enable said FC frame to be reassembled at said intended destination.

The present invention also provides for a Transmission Control Protocol/Internet Protocol ("TCP/IP") protocol stack having a transport layer for transferring over a Gigabit Ethernet one or more FC frames having a frame size for each said FC frame, the improvement comprising said transport layer comprising a storage transport layer, wherein said storage transport layer enables said transport layer to be operative for: determining based upon said frame size of a given FC frame whether to generate one or two Ethernet frames, said one or two Ethernet frames comprising a payload that includes said given FC frame; transmitting said one or two Ethernet Frames including said given FC frame over said Ethernet to an intended destination; and enabling, if necessary, said FC frame to be reassembled from said two Ethernet frames at said intended destination.

The object and advantage of the present invention is that it provides for a method and protocol for the efficient, high bandwidth, low-latency and reliable transfer of variable length FC Frames over the Ethernet.

BRIEF DESCRIPTION OF THE DRAWINGS

The forgoing aspects and the attendant advantages of this invention will become more readily apparent by reference to the following detailed description when taken in conjunction with the accompanying drawings wherein:

FIG. 1A is a diagram illustrating the format of an Ethernet Frame;

FIG. 1B is a diagram illustrating the format of an FC Frame;

DETAILED DESCRIPTION OF THE INVENTION

Figure 2:
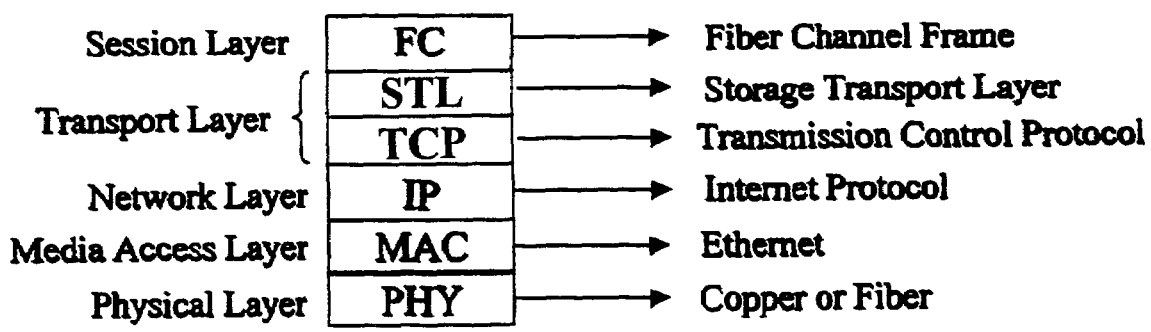
FIG. 2 illustrates a protocol stack for transferring FC Frames over the Ethernet according to a preferred embodiment of the present invention.

FIG. 2 illustrates a protocol stack for transferring FC Frames over Gigabit Ethernet according to a preferred embodiment of the present invention. The protocol stack of FIG. 2 can be used to link one or more SANs to one or more existing LANs, MANs or WANs. As seen in FIG. 2, the protocol stack comprises the five layers of a typical TCP/IP stack as described above and known and understood by one of ordinary skill in the art. Those five layers are a Physical Layer, a Media Access Control ("MAC") Layer, a Network Layer, a Transport Layer, and a Session Layer.

The Gigabit Ethernet is the physical medium for transferring information within the one or more linked networks. Internet Protocol as described above and known and understood by one of ordinary skill in the art is implemented at the Network Layer. Transmission Control Protocol as described above and known and understood by one of ordinary skill in the art is implemented at the Transport Layer. An FC frame is the unit of transfer at the Session Layer for the one or more SANs.

As illustrated in FIG. 2, the protocol stack according to the preferred embodiment further includes a Storage Transport Layer (STL). The STL is a sublayer to the Transport Layer, wherein the STL in conjunction with implementation of TCP comprises the complete Transport Layer for transferring FC Frames over the Ethernet. The STL provides data regarding the size of the FC Frames being transferred, and TCP provides a reliable delivery of the FC frames.

Figure 3:
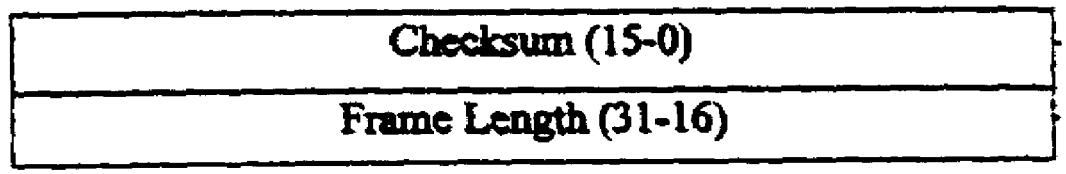
FIG. 3 illustrates the storage transport layer of the protocol stack of FIG. 2.

FIG. 3 illustrates the storage transport layer of the protocol stack of FIG. 2. The STL comprises two fields, a 16 bit Checksum field and a sixteen bit Frame Length field. The Frame Length identifies the size of the FC Frame being transferred. TCP uses this information to map a given FC Frame onto one or two Ethernet Frames to transfer the FC Frame over the Ethernet. TCP would then reliably deliver the resulting one or more Ethernet Frames and reassemble the FC Frame, if necessary, at an intended destination. The Checksum bits help in error checking of the Storage Transport Layer. Preferably the Checksum is an inverted Frame Length.

Thus, the inventive Transport Layer, which includes the STL, functions in a conventional way to handle sequencing and reliable delivery of data packets using TCP. The addition of the STL enables TCP to also handle segmenting and sequencing of FC Frames into one or more Ethernet Frames and enables the reliable delivery of FC Frames over the Ethernet. One of ordinary skill in the art could revise TCP software code or hardware code as appropriate to include these additional elements and functions of the Storage Transport Layer. Moreover, the STL could be expanded to include additional fields.

Figure 4:
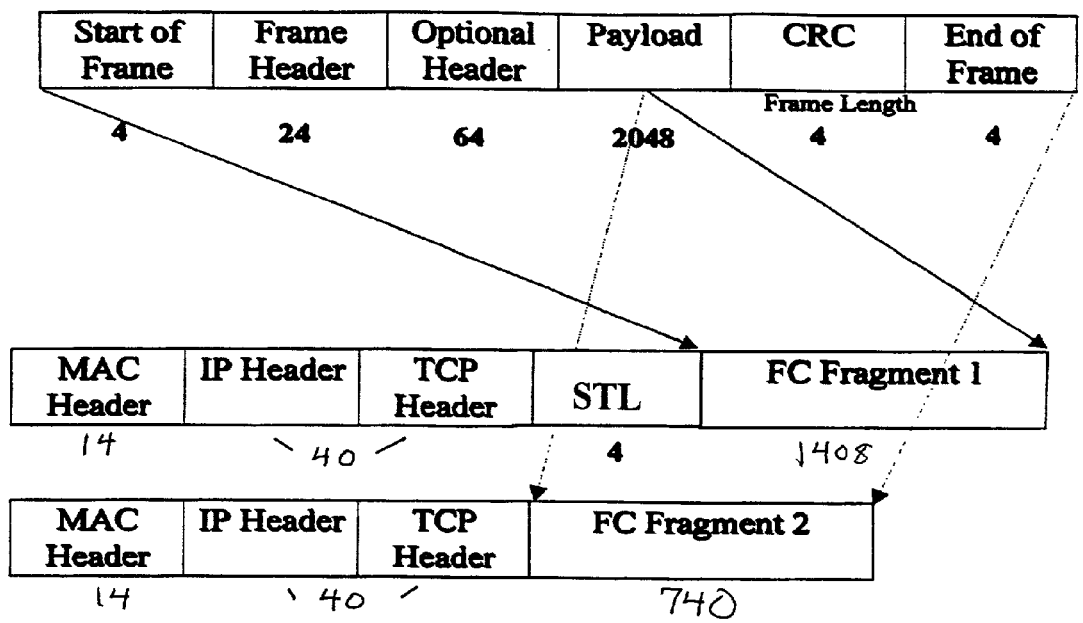
FIG. 4 illustrates a method for segmenting an FC Frame into two Ethernet Frames according to a preferred embodiment of the present invention.

FIG. 4 illustrates a method for segmenting an FC Frame into two Ethernet Frames according to a preferred embodiment of the present invention. In FIG. 4, a 2148 byte FC Frame is segmented into a first and second Ethernet Frame, each capable of having a maximum size of 1500 bytes and a maximum payload size of 1454 bytes. The FC Frame includes a four byte Start of Frame field, a 24 byte Frame Header field, a 64 byte Optional Header field, a 2048 byte Payload field, a four byte Cyclic Redundancy Check ("CRC") field, which includes the length of the FC Frame ("Frame Length"), and a four byte End of Frame field.

The steps of the method illustrated in FIG. 4 are as follows. First, TCP determines based upon the size of the FC Frame that the FC Frame should be encapsulated into two Ethernet Frames. Then TCP divides the FC Frame into two fragments, FC Fragment 1 and FC Fragment 2. FC Fragment 1 includes the four byte Start of Frame, the 24 byte Frame Header, the 64 byte Optional Header, and a first portion of the 2048 byte Payload, wherein FC Fragment 1 does not exceed the maximum payload size of the first Ethernet Frame, and the first Ethernet Frame does not exceed its maximum size. FC Fragment 2 includes a remaining portion of the 2048 byte Payload, the four byte CRC and the four byte End of Frame. After TCP divides the FC frame, TCP then creates a four byte STL field that includes the FC Frame Length. TCP then generates the first and second Ethernet Frames. The First Ethernet frame includes a MAC Header, an IP Header, a TCP Header, the STL field and FC Fragment 1. The second Ethernet frame includes a MAC Header, an IP Header, a TCP Header and FC Fragment 2. Finally, TCP ensures the reliable transmission of the first and second Ethernet Frames including the FC Fragments over the Ethernet to enable TCP to reassemble the FC Frame at an intended destination.

Figure 5:
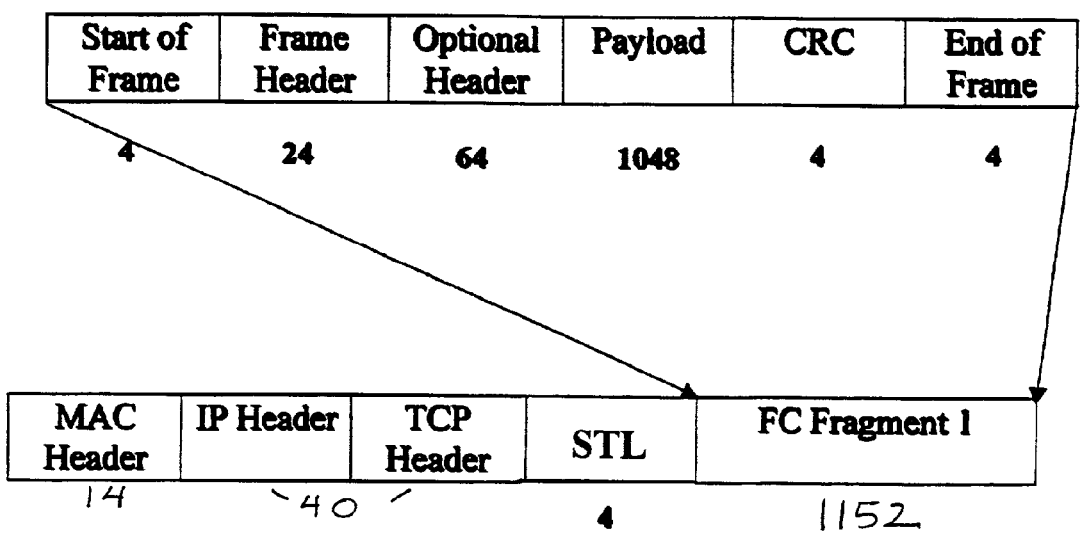
FIG. 5 illustrates a method for encapsulating an FC Frame into a single Ethernet Frame according to another embodiment of the present invention.

FIG. 5 illustrates a method for encapsulating an FC Frame into a single Ethernet Frame according to another embodiment of the present invention. In FIG. 5, a 1148 byte FC Frame is encapsulated into a single Ethernet Frame. The FC Frame includes a four byte Start of Frame field, a 24 byte Frame Header field, a 64 byte Optional Header field, a 1048 byte Payload field, a four byte CRC field, which includes the length of the FC Frame ("Frame Length"), and a four byte End of Frame field.

The steps of the method illustrated in FIG. 5 are as follows. First, TCP determines based upon the size of the FC Frame that the FC Frame should be encapsulated into one Ethernet Frame. Then generates an FC Fragment 1 that includes the four byte Start of Frame, the 24 byte Frame Header, the 64 byte Optional Header, the 1048 byte Payload, the four byte CRC and the four byte End of Frame. TCP then creates a four byte STL field that includes the FC Frame Length. TCP then generates the Ethernet Frame, which includes a MAC Header, an IP Header, a TCP Header, the STL field and FC Fragment 1. Finally, TCP ensures the reliable transmission of the Ethernet Frame including the FC Frame over the Ethernet to an intended destination.

The embodiments of the present invention described above are illustrative of the present invention and are not intended to limit the invention to the particular embodiments described. Accordingly, while the preferred embodiment of the invention has been illustrated and described, it will be appreciated that various changes can be made therein without departing from the spirit and scope of the invention.

What is claimed is:

1. A method for generating one or more Ethernet frames having a maximum length and a maximum payload from a Fibre Channel ("FC") frame having a frame length and for transmitting said FC frame over an Ethernet network to an intended destination, said method comprising the steps of:
   (a) determining whether said frame length is smaller than said maximum payload and if so generating an Ethernet frame wherein its payload comprises said FC frame and transmitting said Ethernet frame including said FC frame over said Ethernet network to said intended destination, and if not then performing steps (b) through (f);
   (b) dividing said FC frame into at least a first FC fragment and a second FC fragment, wherein each of said first FC fragment and said second FC fragment is smaller than said maximum payload;
   (c) generating a storage transport layer field comprising said frame length;
   (d) generating a first Ethernet frame comprising said storage transport layer field and said first FC fragment;
   (e) generating a second Ethernet frame comprising said second FC fragment; and
   (f) transmitting said first Ethernet frame and said second Ethernet frame including said first FC fragment and said second FC fragment therein over said Ethernet network to enable said first FC fragment and said second FC fragment to be reassembled at said intended destination.

2. The method of claim 1, wherein Transmission Control Protocol performs steps (a) through (c).

3. The method of claim 1, wherein said first FC fragment comprises a start of frame field, a frame header field, an optional header field, a first portion of an FC frame payload field and said second FC fragment comprises a second portion of said FC frame payload field, a Cyclic Redundancy Check field and an End of Frame field.

4. The method of claim 1 wherein said frame length is provided only in the storage transport layer field of the first Ethernet frame.

5. The method of claim 1 wherein said storage transport layer field further includes a checksum configured to perform error checking on said storage transport layer field.

6. The method of claim 5 wherein said checksum represents an inverted frame length.

7. The method of claim 1 wherein said storage transport layer field is 4 bytes long.

8. The method of claim 1 wherein said Ethernet network represents a gigabit Ethernet network.

9. The method of claim 8 wherein said Ethernet network represents a gigabit Ethernet network.

10. A method for generating two Ethernet frames having a maximum length and a maximum payload from a Fibre Channel ("FC") frame having a frame length and for transmitting said FC frame over an Ethernet network to an intended destination, said method comprising the steps of:
    (a) determining that said FC frame length is larger than said maximum payload;
    (b) dividing said FC frame into a first FC fragment and a second FC fragment, wherein each of said first FC fragment and said second FC fragment is smaller than said maximum payload;
    (c) generating a storage transport layer field comprising said frame length;
    (d) generating a first Ethernet frame comprising said storage transport layer field and said first FC fragment;
    (e) generating a second Ethernet frame comprising said second FC fragment; and
    (f) transmitting said first Ethernet frame and said second Ethernet frame including said first FC fragment and said second FC fragment over said Ethernet network to enable said FC frame to be reassembled from said first FC fragment and said second FC fragment at said intended destination.

11. The method of claim 10 wherein said frame length is provided only in the storage transport layer field of the first Ethernet frame.

12. The method of claim 10 wherein said storage transport layer held further includes a checksum configured to perform error checking on said storage transport layer field.

13. The method of claim 12 wherein said checksum represents an inverted frame length.

14. The method of claim 10 wherein said storage transport layer field is 4 bytes long.

15. The method of claim 10 wherein said Ethernet network represents a gigabit Ethernet network.

* * * * *